(12) United States Patent
Muneret

(10) Patent No.: US 7,049,026 B2
(45) Date of Patent: May 23, 2006

(54) APPARATUS FOR FILLING THE CASE OF A LEAD BATTERY WITH COMPONENTS FOR FORMING A GELLED ELECTROLYTE

(75) Inventor: Xavier Jean-Marie René Muneret, Berneville (FR)

(73) Assignee: Hawker S.A., Arras (FR)

( * ) Notice: Subject to any disclaimer, the term of this patent is extended or adjusted under 35 U.S.C. 154(b) by 376 days.

(21) Appl. No.: 10/303,844

(22) Filed: Nov. 26, 2002

(65) Prior Publication Data
US 2003/0157400 A1 Aug. 21, 2003

(30) Foreign Application Priority Data
Nov. 28, 2001 (FR) .................................. 01 15397

(51) Int. Cl.
*H01M 2/36* (2006.01)
*H01M 6/04* (2006.01)
(52) U.S. Cl. ............................ 429/72; 429/80; 429/91; 429/204; 429/302; 141/65
(58) Field of Classification Search ................. 141/65, 141/67; 429/72, 80, 81, 91, 204, 225, 302
See application file for complete search history.

(56) References Cited

U.S. PATENT DOCUMENTS

| 3,911,972 A | * | 10/1975 | Hubers et al. ................. 141/7 |
| 4,889,778 A | | 12/1989 | Misra et al. |
| 5,731,099 A | | 3/1998 | Badger et al. |
| 6,120,929 A | * | 9/2000 | Stocchiero ..................... 429/63 |
| 6,588,461 B1 | * | 7/2003 | Morizane ...................... 141/61 |

FOREIGN PATENT DOCUMENTS

| GB | 1 364 438 | 8/1974 |
| JP | 07220717 | 8/1995 |
| JP | 2001297773 | 10/2001 |

* cited by examiner

*Primary Examiner*—Tracy Dove
(74) *Attorney, Agent, or Firm*—Young & Thompson

(57) ABSTRACT

Apparatus for filling the case (20) of a lead battery of the open type or of the sealed type with gas recombination, the case being filled with components for forming a gelled electrolyte, and the apparatus being characterized in that it comprises:
- at least two tanks (1, 2) containing said components, the first tank (1) containing sulfuric acid and the second tank (2) containing a mixture of water and a gelling agent such as particles of silica;
- at least two receptacles (4, 5) each connected to a respective one of the tanks (1, 2) and each containing a piston (10, 11) for expelling said components from said receptacles into pipes (17, 18);
- a mixer (16) into which said pipes (17, 18) open out; and
- a pipe (19) connecting said mixer (16) to the case (20) of said battery through the lid (21) of said battery.

6 Claims, 1 Drawing Sheet

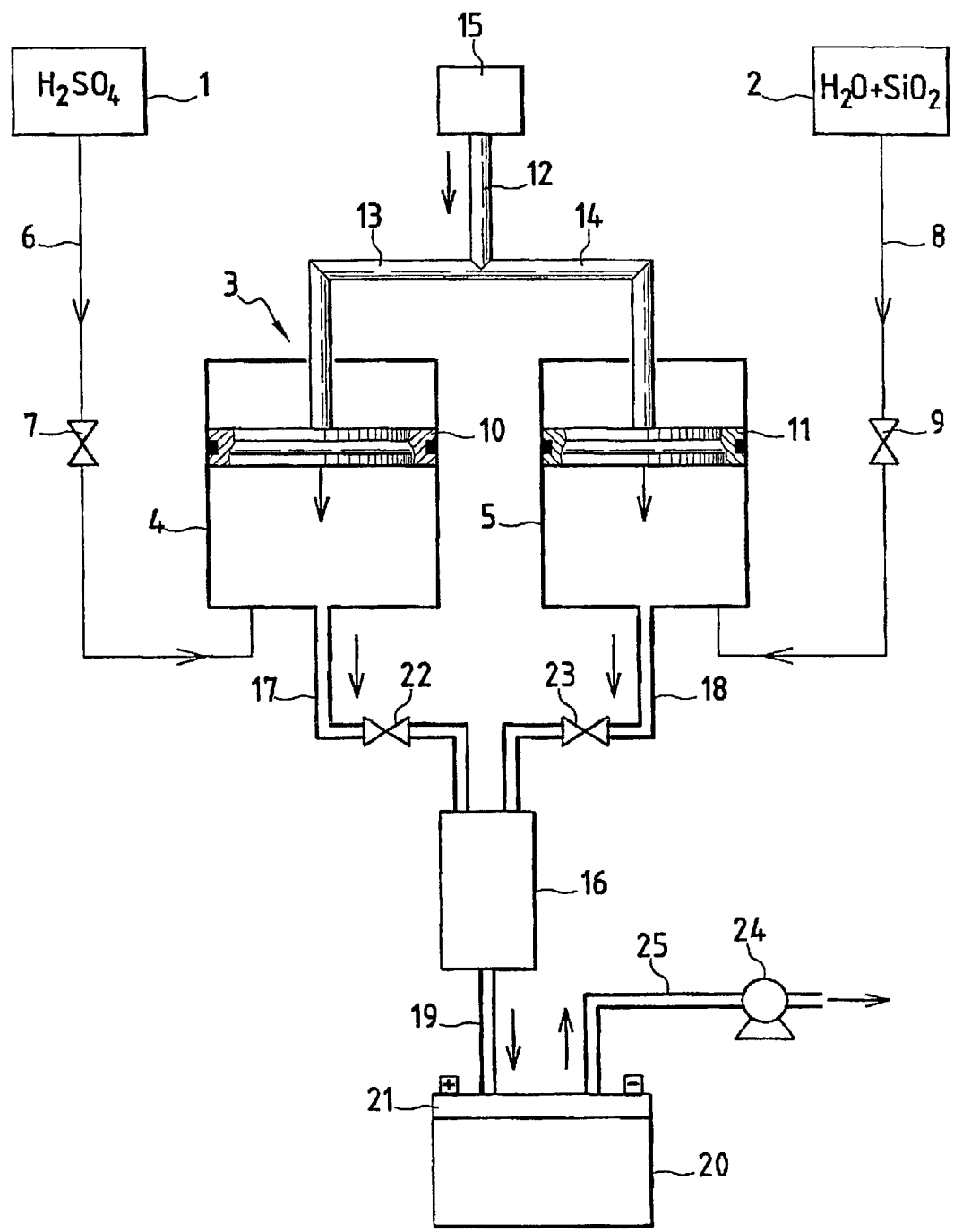

APPARATUS FOR FILLING THE CASE OF A LEAD BATTERY WITH COMPONENTS FOR FORMING A GELLED ELECTROLYTE

The invention relates to the field of lead batteries of the open type or of the sealed type with gas recombination. More precisely, the invention relates to the way the electrolyte for such batteries is prepared when it is in the form of a gel, and also to filling batteries with the electrolyte.

Lead electrical storage batteries, whether of the "open lead" type or of the "gas recombination" type are made up of a stack of positive and negative plates connected to corresponding-polarity terminals and supporting active materials ($PbO_2$ for the positive plates, spongy lead for the negative plates). These plates are immersed in an electrolyte in which the functional element is dilute sulfuric acid. The electrolyte may be in the liquid state. However it is also possible to use an electrolyte in the form of a gel. The gel is made from a mixture of water, sulfuric acid, and finely divided particles of silica. The mixture transforms into a gel after resting for a few tens of seconds or a few minutes. It is put into the case of the battery after the plates have been put into place, and while it is not yet in the gelled state. The plates may previously have been "formed" (i.e. their active components have been given appropriate composition and morphology). For this purpose, the plates are soaked in a bath of liquid electrolyte based on sulfuric acid, and an electric current is passed therethrough. During this operation, the plates are preferably installed in the battery case, and the liquid electrolyte is then emptied out therefrom once the plates have been formed. The electrolyte that is to form the gel is then put into the case. It is also possible to form the plates directly using the electrolyte that has gelled inside the battery case.

Usually, gelled electrolyte is made merely by mixing its components together in a receptacle into which they are inserted in succession after the quantities thereof have been measured out more or less precisely. That method does not always make it possible to obtain very good control over the relative proportions of the various components, nor does it always provide satisfactory control over the quantity of electrolyte that is inserted into the case, and that can lead to the case being underfilled, or on the contrary to it being overfilled, which can lead to gel overflowing.

The object of the invention is to provide a method of preparing the gel and of filling the batteries which avoids the above-mentioned drawbacks.

To this end, the invention provides apparatus for filling the case of a lead battery of the open type or of the sealed type with gas recombination, the case being filled with components for forming a gelled electrolyte, and the apparatus being characterized in that it comprises:

at least two tanks containing said components, the first tank containing sulfuric acid and the second tank containing a mixture of water and a gelling agent such as particles of silica;

at least two receptacles each connected to a respective one of the tanks and each containing a piston for expelling said components from said receptacles into pipes;

a mixer into which said pipes open out; and a pipe connecting said mixer to the case of said battery through the lid of said battery.

Preferably, said pistons are connected to a single device controlling displacement thereof, said device causing them to move simultaneously and at the same speed.

Preferably, the apparatus further comprises means for establishing reduced pressure inside the battery.

Preferably, the mixer has one or more elements encouraging mixing and/or expulsion of the various components it receives, for example a succession of baffles.

Preferably, the apparatus includes automatic control means.

As will have been understood, the invention relies on the principle of using a static mixer for preparing the gel and putting it into the battery case, which mixer is fed from two separate tanks, one containing sulfuric acid and the other the water/silica mixture. Each of these tanks has a respective piston which expels the component contained therein into a pipe opening out into the mixer, into which the components are introduced simultaneously. The mixer delivers the resulting mixture continuously into the case of the battery to be filled, in which it becomes transformed into a gel.

The invention will be better understood on reading the following description given with reference to the sole accompanying FIGURE which is a diagram showing the main members of an example of apparatus for forming gelled electrolyte and for filling a lead acid battery in accordance with the invention.

The installation comprises the following essential elements:

a first tank 1 containing sulfuric acid;

a second tank 2 containing a mixture of water and particles of silica (or some other gelling compound usable for this purpose);

an assembly 3 constituted by:

two receptacles 4, 5, the first of which, 4, is connected via a pipe 6 to the sulfuric acid tank 1, a valve 7 controlling the admission of acid into the receptacle 4, and the second of which, 5, is connected via a pipe 8 to the tank 2 containing the water/silica mixture, a valve 9 controlling admission of the water/silica mixture into the receptacle 5; and a dual-piston system comprising a first piston 10 closing the first receptacle 4 and a second piston 11 closing the second receptacle 5; in the example shown, these two pistons 10 and 11 are connected to each other so as to move simultaneously and at the same speed; for this purpose, a rod 12 is split at one end into two branches 13 and 14 each connected to a respective one of the pistons 10, 11, with the other end of the rod 12 being connected to a device 15 for controlling displacement thereof;

a mixer 16 into which the receptacles 4 and 5 deliver respectively sulfuric acid and the water/silica mixture via pipes 17 and 18 so that the components that are to form the gel that is to serve as the electrolyte of the battery are mixed together therein; and a pipe 19 taking said mixed-together components from the mixer 16 to the case 20 of the battery in which positive and negative plates have previously been placed; for this purpose, the pipe 19 passes through the lid 21 of the battery case; valves 22 and 23 placed in the pipes 17 and 18 either allow or prevent the various liquids being admitted into the mixer 16.

When it is desired to fill a battery with electrolyte, the installation is assembled and it is connected to the lid 21 of the battery case 20, and the receptacles 4 and 5 are filled respectively with sulfuric acid and the water/silica mixture by opening the valves 7 and 9 while the valves 22 and 23 remain closed. The valves 7 and 9 are then closed and the valves 22 and 23 are opened, while also causing the device 15 to advance the pistons 10 and 11 so as to expel controlled quantities of sulfuric acid and water/silica mixture from the receptacles 4, 5. Since both pistons 10 and 11 advance simultaneously and at identical speeds, the respective proportions of the various components penetrating into the mixer 16 are determined by construction and specifically by the dimensional ratios that exist between the two receptacles 4 and 5. This guarantees that the various components are always mixed in appropriate proportions. The design of the installation as a whole also makes it possible to obtain very good control over the total added quantity of the components. This avoids delivering an excessive quantity of electrolyte to the battery which would lead to an overflow, or an insufficient quantity which would spoil the performance of the battery.

The various substances thus come into contact with each other in the mixer 16 from which they are expelled while still under drive from the advancing pistons 10, 11. This expulsion may possibly be assisted by a set of baffles or various obstacles placed inside the mixer 16 to increase the stirring of the components and to ensure that the electrolyte-forming mixture is uniform. In any event, the time spent by the components in the mixer 16 needs to be long enough to ensure that they are properly mixed together. However it must also be short enough to ensure that when the electrolyte-forming mixture penetrates into the case 10 of the battery, it is still in a form that is clearly liquid and that has not yet gelled. Otherwise, the case 20 which already contains the battery plates will not necessarily be filled uniformly. Optionally, gelling should begin in clear manner only once the battery has been filled so as to be sure that the resulting gelled electrolyte is completely uniform and is in good contact with the entire surface area of the plates. It is easy by calculation and experience to determine the dimensional and operational parameters required of the installation (sizes of the mixer 16, and of the receptacles 4 and 5, speed of advance of the pistons 10 and 11, lengths of the various ducts, . . . ) to ensure that this result is achieved and as a function of the various parameters that are specific to each installation: battery size, composition of the electrolyte to be used, . . . .

Optimally, the battery case 20 should be filled at low pressure. For this purpose, a pump 24 is connected via a pipe 25 to the lid 21 and operates before and during the filling operation. This avoids any pockets of air forming within the gelled electrolyte, which would prevent it from making good contact with the plates.

In the description above, it is assumed that the gel is made by mixing together components that come from two tanks 1 and 2. However, if it were desired to involve a greater number of components in the composition of the gel, it would clearly be possible to provide a greater number of tanks, of receptacles, and of associated pistons.

Similarly, any other device for improving the operation and the control of the installation, such as additional valves, flow meters, various sensors, devices for emptying the system, may also be added to those described and shown.

The installation may be controlled entirely by a human operator, or it may be performed by automatic control means having full or partial control over the device 12, 15, controlling the advance of the pistons 10 and 11, controlling the valves 22 and 23, the pump 24, etc., as a function of information such as the level of liquid present in the case 20.

In a variant, provision can be made for the displacements of the two pistons 10 and 11 to be controlled completely independently, thus making it possible to vary the proportions of the various components injected into the mixer 16, if it is thought that that might be required, even if only occasionally.

The control over the pistons 10 and 11 must be particularly precise to ensure that the intended proportions are indeed obtained.

The invention is equally applicable to circumstances in which the plates have been formed prior to filling as it is to circumstances in which the plates are formed after filling.

What is claimed is:

1. Apparatus for filling a case (20) of a lead battery of the open type or of the sealed type with gas recombination, comprising
    A first tank (1) containing sulfuric acid and a second tank (2) containing a mixture of water and a gelling agent;
    two receptacles (4, 5) each connected to a respective one of the tanks (1, 2) and each containing a piston (10, 11) for expelling liquid from the associated said receptacle into an associated pipe (17, 18);
    a mixer (16) into which said pipes (17, 18) open; and
    a pipe (19) connecting said mixer (16) to the case (20) of said battery through a lid (21) of said battery;
    wherein said pistons (10, 11) are connected to a single device (12, 15) controlling displacement thereof, said device causing said pistons to move simultaneously and at the same speed.

2. Apparatus according to claim 1, which further comprises means (24, 25) for establishing reduced pressure inside the battery.

3. Apparatus according to claim 1, wherein the mixer (16) has one or more elements encouraging mixing or expulsion of the liquids received.

4. Apparatus according to claim 3, wherein said mixer (16) contains a succession of baffles.

5. Apparatus according to claim 1, which further includes automatic control means.

6. Apparatus according to claim 1, which further includes emptying means.

* * * * *